United States Patent [19]

Bonvallet et al.

[11] Patent Number: 5,218,635
[45] Date of Patent: Jun. 8, 1993

[54] LOW-FREQUENCY ALTERNATING CURRENT SIGNAL DETECTOR, IN PARTICULAR FOR CENTRAL OFFICE LINE INTERFACE CIRCUITS

[75] Inventors: André Bonvallet, Asnieres; Robert Girard, Colombes; Daniel Perrein, Montigny Les Cormeilles, all of France

[73] Assignee: Alcatel Business Systems, Paris, France

[21] Appl. No.: 540,673

[22] Filed: Jun. 19, 1990

[30] Foreign Application Priority Data

Jun. 19, 1989 [FR] France .................. 89 08119

[51] Int. Cl.$^5$ .............................................. H04M 1/00
[52] U.S. Cl. ...................................... 379/386; 379/377; 379/399; 379/382
[58] Field of Search ............... 379/386, 399, 231, 232, 379/233, 234, 377, 381, 382, 383; 328/138; 340/825.48; 375/75

[56] References Cited

U.S. PATENT DOCUMENTS

| | | | |
|---|---|---|---|
| 4,386,239 | 5/1983 | Chien | 379/386 |
| 4,540,855 | 9/1985 | Szlam et al. | 379/386 |
| 4,599,495 | 7/1986 | Richards | 379/386 |
| 4,689,760 | 8/1987 | Lee et al. | 379/386 |
| 4,922,528 | 5/1990 | Hubert et al. | 379/386 |

FOREIGN PATENT DOCUMENTS 338881 9/1977 Austria .
2551604 3/1985 France .

OTHER PUBLICATIONS

IBM Technical Disclosure Bulletin, vol. 22, No. 9, Feb. 1980, pp. 4098–4099; Orengo: "Circuit for improving noise immunity in tone detection."
IBM Technical Disclosure Bulletin, vol. 26, No. 8, Jan. 1984; Y. Bonnet: "Tone detection circuit."

Primary Examiner—Thomas W. Brown
Assistant Examiner—Jason Chan
Attorney, Agent, or Firm—Sughrue, Mion, Zinn, Macpeak & Seas

[57] ABSTRACT

A low-frequency alternating current signal detector for recognizing tone signals in a central office line interface circuit connecting a private telephone installation to an analog telephone network subscriber line. The low-frequency alternating current signal detector includes an amplifier (1) connected to the input of a bandpass filter (2) and to the input of a first rectifier-filter (3), a second rectifier-filter (4) and a threshold presence detector (5) connected to the output of the bandpass filter (2). The output of the threshold presence detector (5) selectively enables comparison by a comparator (6) of the bandpass filter input and output signals and signalling of the presence of an alternating current signal.

6 Claims, 2 Drawing Sheets

LOW-FREQUENCY ALTERNATING CURRENT SIGNAL DETECTOR, IN PARTICULAR FOR CENTRAL OFFICE LINE INTERFACE CIRCUITS

BACKGROUND OF THE INVENTION

The invention concerns a low-frequency alternating current signal detector, in particular for recognizing tone or possibly charging signals in a central office line interface circuit (hereinafter COLIC) connecting a private telephone installation to an analog telephone network subscriber line.

COLICs connect a private telephone installation, in particular a switch or a key service unit, to a local central office, which is usually part of a telephone network, to enable telephones or terminals connected to the private installation to communicate with telephones or terminals connected to the network but not connected to the installation.

At present, many network subscriber lines are still of the analog type and transmit speech signals in analog form on two wires in an audible frequency band between 300 and 3 400 Hz. The two line wires are also used to transmit signalling, for example in the form of alternating current signals at specific frequencies, either pulsed or of relatively long duration.

Existing private telephone installations usually employ time-division switching with the result that the speech signals are coded in digital form. This type of switching is well suited to the transmission of speech and data signals on the same media according to the changing requirements of users. It is therefore necessary to detect alternating current signalling in order to convert it into digital form on entering the installation in which it is to be processed.

OBJECT OF THE INVENTION

The invention therefore proposes a detector for low-frequency alternating current signals, in particular tone or charging signals, and in particular for a COLIC for connecting a private telephone installation to an analog telephone network subscriber line, which detector is reliable, inexpensive and reduced in size.

SUMMARY OF THE INVENTION

According to one characteristic of the invention, this alternating current signal detector comprises an input amplifier the output of which is connected to the input of a bandpass filter and to the input of a first rectifier-filter. A second rectifier-filter is connected to the output of the bandpass filter and a threshold presence detector which is also connected to the output of the bandpass filter. When the threshold presence detector detects a signal at a level higher than a threshold level at the output of the bandpass filter, it enables comparison by a comparator of the input and output signals of the bandpass filter, the presence at the output of the bandpass filter of a signal with an amplitude higher than that of the signal at the input is characteristic of the presence of the expected alternating current signal and a binary signal is provided at the comparator output.

The invention, its characteristics and its advantages are specified in the following description relating to the figures listed below.

DETAILED DESCRIPTION OF THE PREFERRED EMBODIMENT

Figure 1:
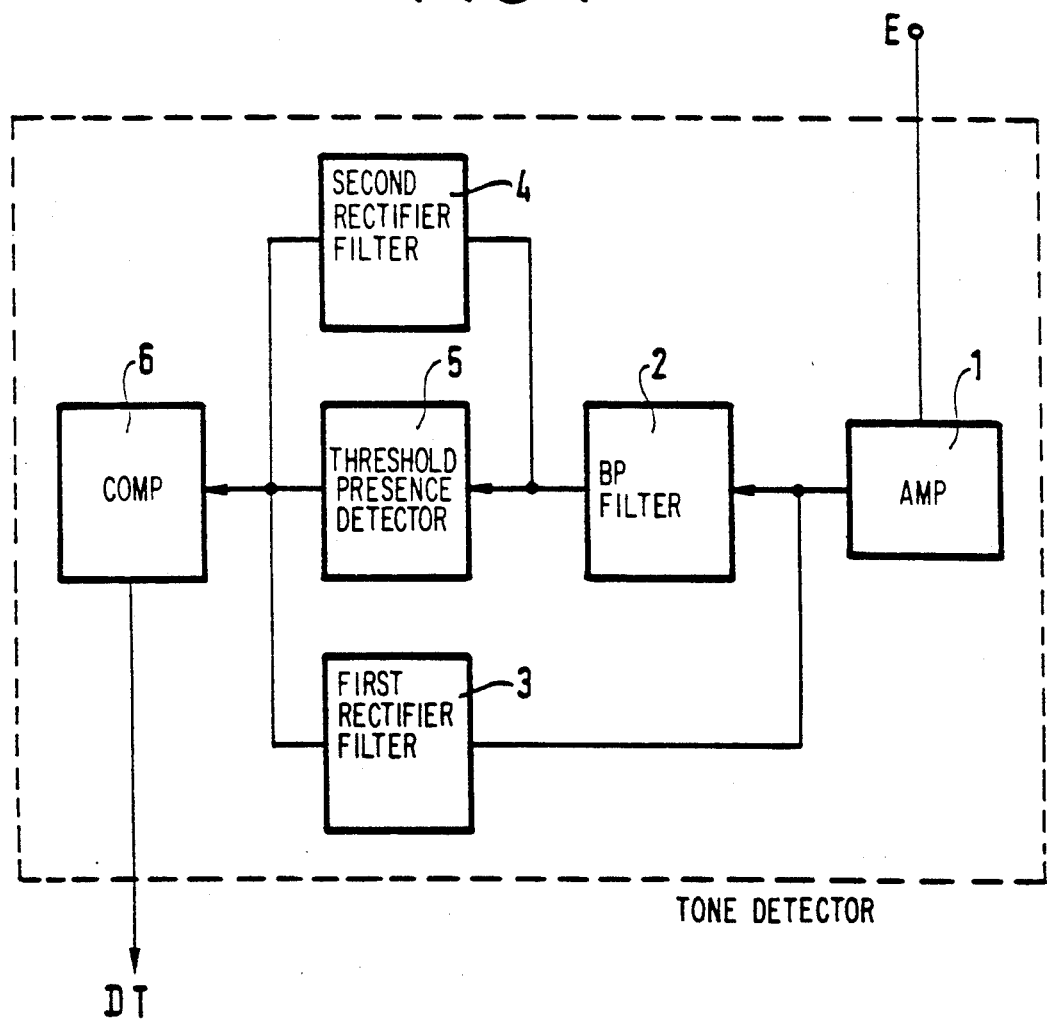
FIG. 1 is a block schematic of a tone detector.

The tone detector schematically represented in FIG. 1 is adapted, for example, to capture a dial tone transmitted to its input E in the form of a sinusoidal signal in the frequency band between 300 and 500 Hz.

The tone detector includes an amplifier 1 which is connected to the terminal E.

The output of the amplifier 1 is connected to the input of a bandpass filter 2 and to the input of a first rectifier-filter 3.

The bandpass filter 2 is, for example, a simple second order filter which amplifies signals in the band between 300 and 500 Hz and attenuates signals whose frequency is above 600 Hz or below 160 Hz.

A second rectifier-filter 4 is connected to the output of the bandpass filter 2 and enables comparison of the signals at the input and the output of the bandpass filter 2, in conjunction with the first rectifier-filter 3.

The presence of an output signal of the bandpass filter having a level clearly higher t the level o the signal at the input is interpreted as characterizing the presence of the tone to be detected, provided that the level of this output signal is above a predetermined minimal level which is set by a threshold presence detector 5 connected to the output of the bandpass filter.

The output signals from the two rectifier-filters 3 and 4 are sent to a comparator 6 which supplies a binary logic signal DT characteristic of the presence or absence of a tone when it receives a command signal supplied by the threshold presence detector 5 when the latter detects a signal with sufficient level at its input.

This arrangement eliminates the need for a highly selective filter, necessarily of a high order and therefore costly.

Figure 2:
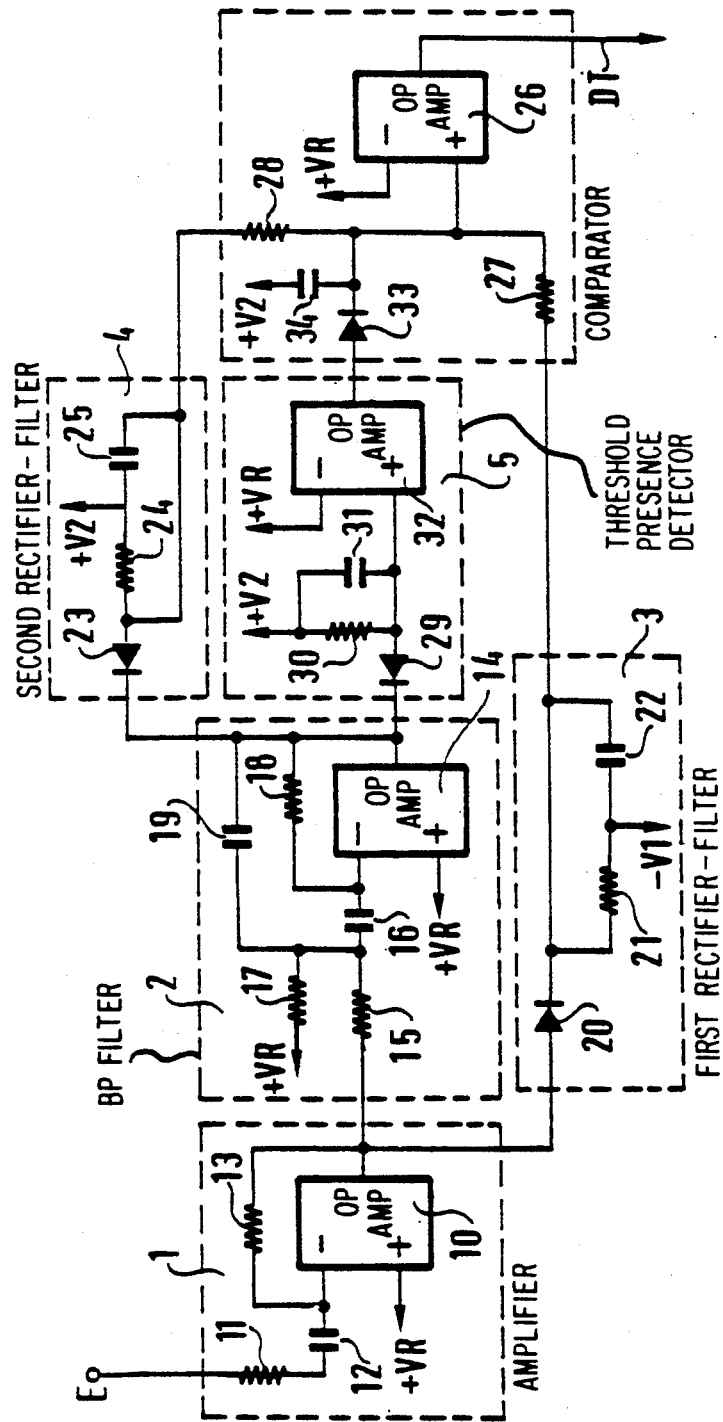
FIG. 2 shows one embodiment of the tone detector schematically represented in FIG. 1.

FIG. 2 shows one embodiment of the tone detector from FIG. 1.

The amplifier 1 from FIG. 1 comprises an operational amplifier 10 having its inverting input connected to the input E via a resistor 11 and a capacitor 12; the non-inverting input of this operational amplifier is connected to a medium-amplitude reference voltage $+VR$ enabling use of all the available dynamic range and avoiding clipping of the received signal.

A resistor 13 conventionally loops the output of this operational amplifier 10 to its inverting input. The bandpass filter 2 centered on the frequency of the expected tone is based on an operational amplifier 14 whose inverting input is connected to the output of the amplifier 10 via a resistor 15 which is in series with a capacitor 16, the non-inverting input being connected to the voltage $+VR$.

The common point of the resistor 15 and the capacitor 16 is connected to the voltage $+VR$ by a resistor 17. The output of the amplifier 14 is fed back to its inverting input via a resistor 18 and fed back via a capacitor 19 to the common point of the resistors 15 and 17 and the capacitor 16.

The first rectifier-filter 3 is connected to the output of the operational amplifier 10 by a diode 20 the anode of which is connected to this output. The first rectifier-filter 3 includes a high-value resistor 21 and a capacitor 22 connected in parallel between the cathode of the diode 20 and a negative supply voltage $-V1$ to enable storage of the maximum values of the positive half-cycles of the signal applied to the input of the bandpass filter.

The second rectifier-filter 4 is connected to the output of the operational amplifier 14 by the diode 23, the cathode of which is connected to this output. The second rectifier filter 4 includes a resistor 24 and a capacitor 25 connected in parallel between the anode of the diode 23 and a positive supply voltage +V2. The second rectifier-filter enables storage of the maximum negative values of the signal at the bandpass filter output.

The output signals from the two rectifier-filters 3, 4 are applied to the non-inverting input of an operational amplifier 26 via respective high-value, resistors 27, 28. The inverting input of the operational amplifier 26 is connected to the voltage +VR.

The threshold presence detector 5 also includes a rectifier-filter, formed by a diode 29 whose cathode is connected to the output of the operational amplifier 14 and a resistor 30 and a capacitor 31 in parallel between the anode of the diode 29 and the voltage +V2. The output of this rectifier-filter is the common point of the anode of the diode 29, the resistor 30 and the capacitor 31, and it is connected to the non-inverting input of an operational amplifier 32 whose inverting input is connected to the voltage +VR.

The operational amplifier 32 is connected by a diode 33 to the non-inverting input of the amplifier 26, as well as to the resistors 27 and 28 which are connected to the output of the rectifier-filters 3 and 4. If the bandpass filter output signal is below a threshold value set by the diode 29 the output signal from the operational amplifier 26 is set by that of the operational amplifier 32 and comprises a binary signal of opposite value to that characterizing the presence of a tone on the DT link. If the bandpass filter output signal, in other words the output signal from the operational amplifier 14, exceeds the threshold level set by the diode the operational amplifier 32 reverse biases the diode 33 and the signal applied to the non-inverting input of the operational amplifier 26 is the sum of the opposite polarity signals supplied by the rectifier-filters 3 and 4 via the resistors 27 and 28. A binary signal characteristic of detection of tone is then produced on the DT link if the value of the signals at the output ends of the resistors 27, 28 indicates the existence of a filtered signal with an amplitude higher than that of the signal applied to the filter input.

We claim:

1. A low-frequency alternating current signal detector for recognizing tone signals in a central office line interface circuit connecting a private telephone installation to an analog telephone network subscriber line, said low-frequency alternating current signal detector comprising: an input amplifier, an input of said input amplifier being connected to an input of a bandpass filter and to an input of a first rectifier-filter, a second rectifier-filter is connected between an output of the bandpass filter and an output of a threshold presence detector, an input of said threshold presence detector receives the output of the bandpass filter and when said threshold presence detector detects an output signal from said bandpass filter which is at a level higher than a threshold level, said threshold presence detector enables a comparator to compare an input signal and the output signal of said bandpass filter, such that when the output signal of the bandpass filter has an amplitude higher than that of the input signal of said bandpass filter, an expected alternating current signal is determined to be present and the comparator generates a binary signal in response to the presence of the expected alternating current signal, wherein said comparator is connected to a common point to which an output of said first rectifier-filter and an output of said second rectifier-filter are supplied along with the output of said threshold presence detector.

2. The low-frequency alternating current signal detector according to claim 1 characterized in that the input amplifier includes an operational amplifier having an inverting input connected to a first resistor and a capacitor, a non-inverting input of said operational amplifier being connected to a reference voltage to use all of the available dynamic range and avoid clipping of a signal received by said input amplifier, a second resistor looping an input of said operational amplifier to its inverting input.

3. The low-frequency alternating current signal detector according to claim 1 characterized in that the bandpass filter is a second order filter based on an operational amplifier whose inverting input is driven by the output of the input amplifier via a first resistor in series with a first capacitor and whose output is looped to the inverting input of said operational amplifier via a second resistor and a second capacitor connected to a common point of the first resistor and the first capacitor.

4. The low-frequency alternating current signal detector according to claim 1 characterized in that the first rectifier-filter includes a first resistor and a first capacitor in parallel between a cathode of a first diode whose anode is connected to the output of the input amplifier and a negative supply voltage and, said second rectifier-filter includes a second resistor and a second capacitor in parallel between a positive supply voltage and an anode of a second diode whose cathode is connected to the output of the bandpass filter.

5. The low-frequency alternating current signal detector according to claim 1 characterized in that the threshold presence detector includes a resistor and a capacitor in parallel between a positive supply voltage and an anode of a diode whose cathode is connected to the output of the bandpass filter, a non-inverting input of an operational amplifier setting said threshold level and connected to the anode of said diode and whose inverting input is connected to a positive voltage corresponding to a reference voltage.

6. The low-frequency alternating current signal detector according to claim 1 characterized in that the comparator includes an operational amplifier whose inverting input is connected to a reference voltage and whose non-inverting input is connected to the output of each of said first and second rectifier-filters via respective first and second resistors and to the output of the threshold presence detector via a forward-biased diode, a cathode of said forward-biased diode being connected to a positive voltage by a capacitor.

* * * * *